US012321326B2

(12) United States Patent
Dutertre et al.

(10) Patent No.: US 12,321,326 B2
(45) Date of Patent: Jun. 3, 2025

(54) MULTIPATH VERIFICATION OF DATA TRANSFORMS IN A SYSTEM OF SYSTEMS

(71) Applicant: SRI International, Menlo Park, CA (US)

(72) Inventors: Bruno Dutertre, Mountain View, CA (US); Susmit Jha, Redwood City, CA (US); Huascar Sanchez, San Ramon, CA (US); Patrick Lincoln, Woodside, CA (US); Eric M. Pearson, Redwood City, CA (US); Richard Dean, Los Altos, CA (US); Ian A. Mason, La Selva Beach, CA (US)

(73) Assignee: SRI International, Menlo Park, CA (US)

( * ) Notice: Subject to any disclaimer, the term of this patent is extended or adjusted under 35 U.S.C. 154(b) by 359 days.

(21) Appl. No.: 17/644,946

(22) Filed: Dec. 17, 2021

(65) Prior Publication Data

US 2022/0197881 A1    Jun. 23, 2022

Related U.S. Application Data

(60) Provisional application No. 63/130,245, filed on Dec. 23, 2020.

(51) Int. Cl.
*G06F 16/242* (2019.01)
*G06F 16/22* (2019.01)
(Continued)

(52) U.S. Cl.
CPC .......... *G06F 16/22* (2019.01); *G06F 16/2433* (2019.01); *G06F 16/24534* (2019.01)

(58) Field of Classification Search
None
See application file for complete search history.

(56) References Cited

U.S. PATENT DOCUMENTS

2007/0180151 A1* 8/2007 Richardson ............. H04L 67/12
  709/248
2011/0138362 A1* 6/2011 Keidar-Barner .... G06F 9/44589
  717/126

(Continued)

OTHER PUBLICATIONS

Wolfgang Ludwig; ARB: a software environment for sequence data; Nucleic Acids Research, vol. 32, Issue 4, Feb. 15, 2004 , pp. 1363-1371, (Year: 2004).*

(Continued)

*Primary Examiner* — Ann J Lo
*Assistant Examiner* — Jermaine A Mincey
(74) *Attorney, Agent, or Firm* — Shumaker & Sieffert, P.A.

(57) ABSTRACT

Processing circuitry is configured to obtain a data structure that defines a plurality of conversions of data between pairs of fields; perform a search to identify a plurality of paths from a source node of the data structure to a destination node of the data structure, wherein the source node corresponds to a first field of the fields and the destination node corresponds to a second field of the fields; convert, for each path of the plurality of paths, transforms represented by corresponding edges of the path to a sequence of transforms that conform to a solver format; process the sequence of transforms for each path to determine whether all paths of the plurality of paths are equivalent up to an equivalence relation; and output an indication of whether all paths of the plurality of paths are equivalent up to an equivalence relation.

18 Claims, 9 Drawing Sheets

(51) Int. Cl.
*G06F 16/2453* (2019.01)
*G06F 16/27* (2019.01)
*G06F 16/34* (2025.01)

(56) References Cited

U.S. PATENT DOCUMENTS

2018/0143826 A1* 5/2018 Crabtree .................. G06F 8/77
2019/0384836 A1* 12/2019 Roth .................... G06F 16/252
2020/0073739 A1* 3/2020 Rungta ..................... G06F 8/60
2020/0334272 A1* 10/2020 Hrastnik ............... G06F 16/258

OTHER PUBLICATIONS

Bengt Ahlgren; A survey of Information-Centric Networking;2012; IEEE; pp. 26-36.*
Dutertre, "Yices Manual," SRI International, Version 2.6.4, Nov. 10, 2021, 101 pp.
Fortunato, "Stitches SoS Technology Integration Tool Chain for Heterogeneous Electronic Systems," Apogee Research, Sep. 9, 2016, 43 pp.

* cited by examiner

```
let aux$1:AR.Tracker.Time =
    AR.Tracker.Time::transformRadarTimeToTrackerTime(input.Header.Time);

let aux$2:AR.RM.Time = AR.RM.Time::transformTrackerTimeToRMTime(aux$1);

let aux$3:AR.NFOV.Time =
    AR.NFOV.Time::transformRMTimeToNFOVTime(aux$2);

AR.Display.Time::tracetransformNFOVTimeToDisplayTime(aux$3)
```

MULTIPATH VERIFICATION OF DATA TRANSFORMS IN A SYSTEM OF SYSTEMS

This application claims the benefit of U.S. Provisional Application No. 63/130,245 filed on Dec. 23, 2020, the entire content of which is incorporated herein by reference.

GOVERNMENT RIGHTS

This invention was made with Government support under Contract FA8650-16-C-7656 awarded by the Defense Advanced Research Project Agency (DARPA). The Government has certain rights in the invention.

TECHNICAL FIELD

This disclosure generally relates to computing systems.

BACKGROUND

A system of systems (SoSs) includes systems (sometimes referred to herein as "subsystems") that exchange data using messages. For example, an airplane may include many systems such as a navigation system, a communication system, an electrical system, a cooling system and many others, and these systems may exchange data using messages. Another example is an Internet of Things (IoT) system that includes combinations of various devices and systems within the IoT system, such as device drivers. Another example of a system of systems may be a squadron of airplanes.

To assess interoperability of the SoSs, models may be developed to predict future behavior of the SoSs. For example, an aerodynamic performance model of an aircraft may enable an autopilot module of the aircraft to conduct flight operations safely under a wide range of environmental conditions. However, as the complexity of subsystems increases, creating reliable predictable models becomes more difficult, which may impede the development of SoSs.

SUMMARY

In general, the disclosure describes techniques for verifying whether multiple paths through a system of systems (SoS) are equivalent using a data structure that models the SoS. Each path represents a different combination of transforms performed by different nodes in a system of systems, and multiple paths are equivalent if they can each correctly map a first message format to a second message format.

In some examples, a method of path verification for a system of systems includes: obtaining a data structure that defines a plurality of conversions of data between pairs of fields; performing a search to identify a plurality of paths from a source node of the data structure to a destination node of the data structure, wherein the source node corresponds to a first field of the fields and the destination node corresponds to a second field of the fields; converting, for each path of the plurality of paths, transforms represented by corresponding edges of the path to a sequence of transforms that conform to a solver format; processing the sequence of transforms for each path to determine whether all paths of the plurality of paths are equivalent up to an equivalence relation; and outputting an indication of whether all paths of the plurality of paths are equivalent up to an equivalence relation.

In some examples, a method of path verification for a system of systems includes: obtaining an updated data structure for a data structure, wherein the data structure defines a first plurality of conversions between pairs of fields, wherein the updated data structure defines a second plurality of conversions between pairs of fields, and wherein the first plurality of conversions between pairs of fields and the second plurality of conversions between pairs of fields are not equivalent; performing a search to identify a first path and a second path from a source node of the updated data structure to a destination node of the updated data structure, wherein the source node corresponds to a first field of the fields in the updated data structure, wherein the destination node corresponds to a second field of the fields in the updated data structure, wherein the first path comprises fields in the data structure, and wherein the second path comprises at least one field from the updated data structure that is not in the data structure; converting, for the first path and the second path, transforms represented by corresponding edges of the first path and the second path to a sequence of transforms that conform to a solver format; processing the sequence of transforms for the first path and the second path to determine whether the first path and the second path are equivalent up to an equivalence relation; and outputting an indication of whether the first path and the second path are equivalent up to an equivalence relation.

In some examples, a system includes: processing circuitry configured to: obtain a data structure that defines a plurality of conversions of data between pairs of fields; perform a search to identify a plurality of paths from a source node of the data structure to a destination node of the data structure, wherein the source node corresponds to a first field of the fields and the destination node corresponds to a second field of the fields; convert, for each path of the plurality of paths, transforms represented by corresponding edges of the path to a sequence of transforms that conform to a solver format; process the sequence of transforms for each path to determine whether all paths of the plurality of paths are equivalent up to an equivalence relation; and output an indication of whether all paths of the plurality of paths are equivalent up to an equivalence relation.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1A:
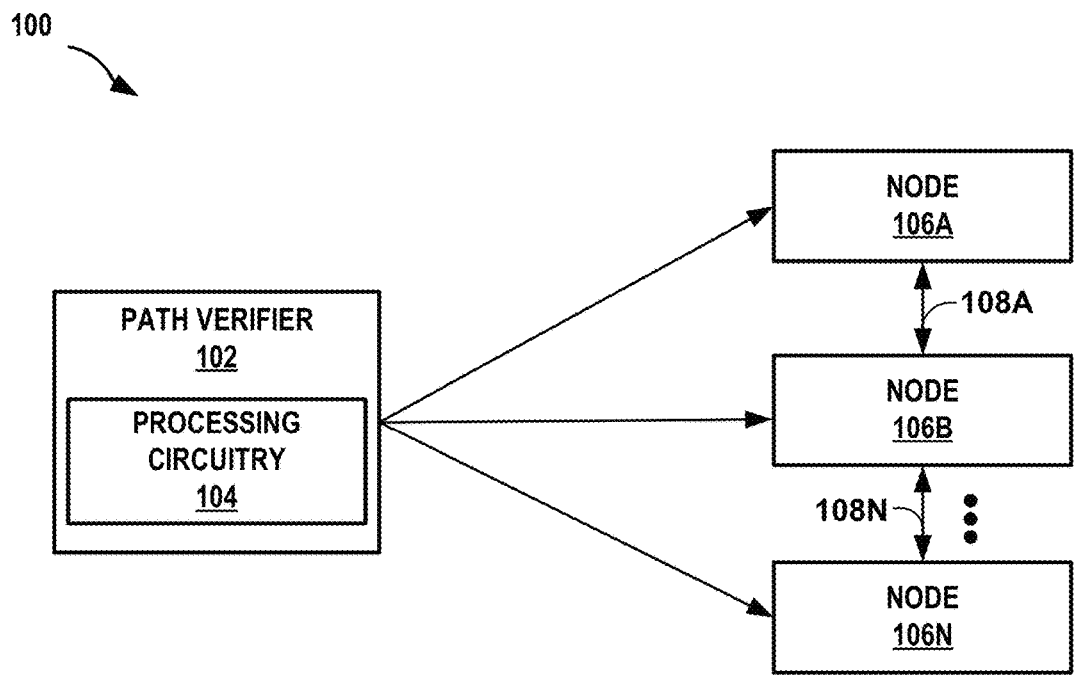
FIG. 1A is a conceptual diagram illustrating an example system for verifying path equivalence, in accordance with the techniques of the disclosure.

This disclosure describes inventive concepts with reference to specific examples. However, the intent is to cover all modifications, equivalents, and alternatives of the inventive concepts that are consistent with this disclosure. It will be apparent, however, to one of ordinary skill in the art that the present approach can be practiced without these specific details. Thus, the specific details set forth are merely exemplary, and is not intended to limit what is presently disclosed. The features implemented in one embodiment may be implemented in another embodiment where logically possible. The specific details can be varied from and still be contemplated to be within the spirit and scope of what is being disclosed.

Some systems of systems (SoSs) may exchange data between subsystems (also referred to herein as "nodes") using messages. For instance, a system may use a first message format for communication between a first node and a second node and a second message format for communication between the second node and a third node.

To exchange data between the first node and the third node via the second node, a system may require the first node, the second node, and the third node to each support a common message format (e.g., the first message format or the second message format). Alternatively, the system may use translation tools configured to translate between the various message formats. However, common message formats and translation tools have significant disadvantages.

Common message formats typically lead to reduced features and become obsolete. For example, subsystem developers tend to develop new features that are outside the common message formats, resulting in incompatibilities. As for translation tools, translating from the various formats supported by all nodes may not scale efficiently if done pairwise. For example, if the subsystems use N different formats for messaging, $N^2$ translators may be necessary. Furthermore, each new node added to the system may require developing N new translators in order to enable message passing between the new node and the other nodes.

Rather than using common standard formats and translation tools, a system may be configured to apply a sequence (e.g., a compilation) of data transformations ("transforms") to a first message format to convert the first message format into a second message format. Different sequences of transforms (sometimes referred to herein as "paths") may be performed by different nodes in the system to convert the first message format into the second message format. In general, equivalence between multiple paths for converting message formats is desirable because multipath equivalence may improve the validity and consistency of message format conversions performed by nodes of the system. Multiple paths may be equivalent if the paths are equivalent up to an equivalence relation, such as commutativity. In other words, the notion of equivalence used herein can be exact equivalence or can be generalized to equivalence up to some equivalence relation.

Techniques described herein may help to allow a system to statically (i.e., without applying the transforms) verify multipath equivalence. For example, a system may be configured to use a path verifier that evaluates an assertion that the sequence of (one or more) transforms for each path of a plurality of paths is equivalent up to an equivalence relation. Responsive to determining that each path of the plurality of paths is equivalent up to an equivalence relation, system may output an indication that the assertion is satisfied. In this way, techniques described herein may facilitate interoperability of existing components that may not have been originally designed to co-operate, which may in turn reduce the time and cost of building SoSs.

FIG. 1A is a block diagram illustrating an example system 100 in accordance with the techniques of this disclosure. As shown, system 100 includes a path verifier 102 and nodes 106A-106N (collectively, "nodes 106"). Nodes 106 may represent a SoS. System 100 is for example purposes only. For example, system 100 may include additional or fewer components.

Path verifier 102 may be configured to determine multipath equivalence. In the example of FIG. 1A, path verifier 102 includes processing circuitry 104. Processing circuitry 104 may include any one or more of a microprocessor, a controller, a digital signal processor (DSP), an application specific integrated circuit (ASIC), a field-programmable gate array (FPGA), or equivalent discrete or integrated logic circuitry.

Each of nodes 106 may include processing circuitry configured to exchange data with other nodes 106 using messages. Each of nodes 106 may be, for instance, a controller, a computer, a sensor, an appliance, or a mobile device. Nodes 106 may be components of a larger system, such as a vehicle or distributed computing system. Processing circuitry of nodes 106 may include any one or more of a microprocessor, a controller, a digital signal processor (DSP), an application specific integrated circuit (ASIC), a field-programmable gate array (FPGA), or equivalent discrete or integrated logic circuitry.

Nodes 106 may communicate to each other over communication links according to a communication protocol. For example, node 106A may communicate with node 106B using communication protocol session 108A. Node 106B may communicate with node 106N using communication protocol session 108N. Communication protocols sessions 108 may operate according to well-defined message formats.

Nodes 106 may implement transcoders to transform messages that are received or generated by a first node in order that the transformed messages conform to a message format understood by a second node. For example, node 106B may receive, from node 106A, a first message in a first format that corresponds to communication protocol session 108A. Node 106B may transcode the first message to a second message in a second format that corresponds to communication protocol session 108N and send the second message to node 106N. In this way, node 106B may transform and relay data included in the first message from node 106A to node 106N into a format that can be understood by node 106N. Message formats may include structural information, such as which subfields are present in a message, types of subfields, and/or lengths of subfields.

Figure 1B:
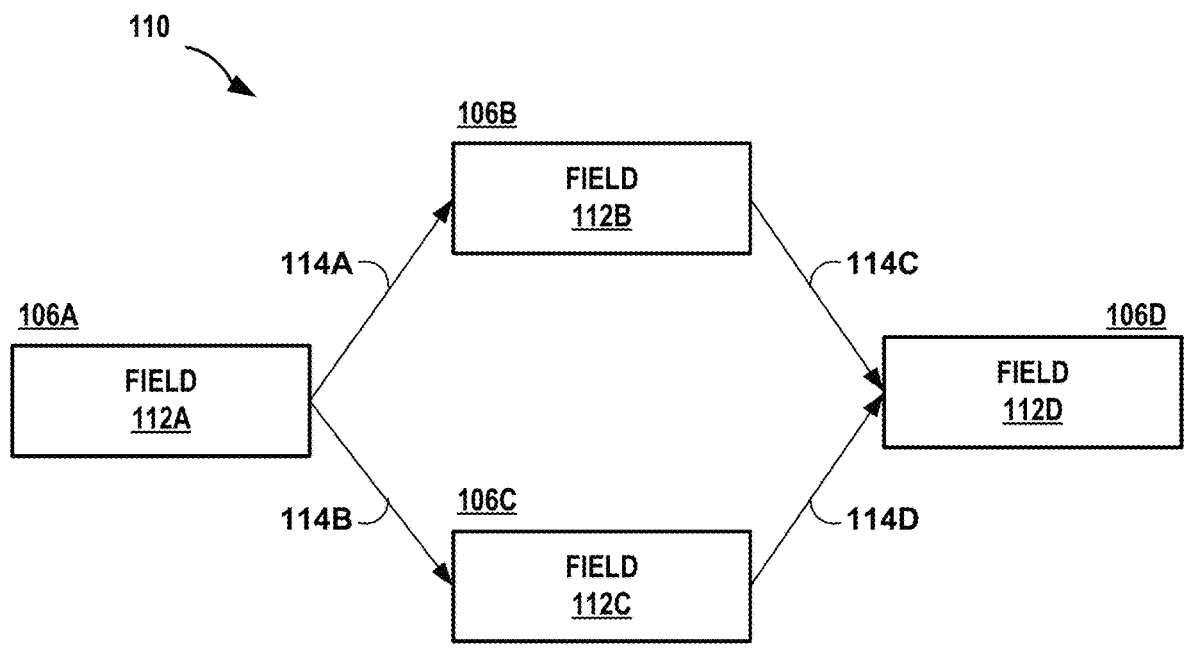
FIG. 1B is a conceptual diagram illustrating an example data structure in accordance with the techniques of the disclosure.

FIG. 1B is a block diagram illustrating an example data structure 110 in accordance with the techniques of the disclosure. Data structure 110 may be based on a node topology of communication sessions among nodes 106 of system 100 of FIG. 1A. Data structure 110 includes a set of fields 112A-112D (collectively, "fields 112"). Each of fields 112 defines or corresponds to a message format. In some examples, one or more of fields 112 can be transformed into another format by one of nodes 106 by applying a transform. In some examples, each of fields 112 may include a set of subfields. In such examples, data structure 110 may further include a set of properties that constrain the data of any of fields 112, such as at least one subfield of the set of subfields (e.g., values for the subfield 'latitude' must be between −180 and +180 degrees, inclusive) for any of fields 112.

Data structure 110 may further include transforms 114A-114D (collectively, "transforms 114") that map message formats of fields 112 to each other. In the example of FIG. 1B, each of transforms 114 may be represented by an edge of data structure 110. In this example, the edge is a directed edge of data structure 110.

Data structure 110 includes one or more "paths" between pairs of nodes, where each of the paths is a set of edges by which a source node (representing one of fields 112) may reach a destination node (representing another one of fields 112). The path represents a sequence of transforms that can be applied to a message conforming to a format of a first field represented by the source node in order to transcode the message to conform to a format of a second field represented by the destination node. For example, as shown in FIG. 1B, data structure 110 depicts two possible paths from field 112A to field 112D: a first path via field 112B and a second path via field 112C. The first path includes edges corresponding to a sequence of transforms including transform 114A and transform 114C. The second path includes edges corresponding to a sequence of transforms including transform 114B and transform 114D. These are not the only possible paths in data structure 110.

As an example that corresponds to the example from FIG. 1A, transform 114A may be applied to data that conforms to a format of field 112A to transcode the data to conform to a format of field 112B. Node 106B may apply transform 114A to its input data; alternatively, node 106A may apply transform 114A to its output data. The data may be transformed further. Transform 114C may be applied to the data that conforms to a format of field 112B to transcode the data to conform to a format of field 112D. Node 106D may apply transform 114C to its input data; alternatively, node 106B may apply transform 114C to its output data. In this way, data that conforms to a format of field 112A may be transformed, by serial application of transforms 114A and 114C, to a format of field 112D.

As used herein, an edge of data structure 110 is a transform that can be applied by a node of a SoS to transcode a message from a first data format to a second data format. Because such transforms are applied by nodes of the SoS in order to conform to communication protocol sessions, an edge may be considered as connecting an output field of one node and an input field of another node, the two nodes exchanging data with each other via a communication protocol session that uses messages that conform to a format of either the output field or the input field. For example, transform 114A may be considered as connecting an output field 112A for node 106A to an input field 112B for 106B. However, transform 114C may be considered as connecting an output field 112B for node 106B to an input field 112D for node 106D. Put another way, in order for node 106B to communicate via a communication protocol session with node 106D, node 106B may need to transcode a message received from node 106A.

As data structure 110 is illustrated here to include both fields 112 (represented by nodes 106 of data structure 110) and transforms 114 (represented by edges of data structure 110), for purposes of this disclosure, data structure 110 may sometimes be referred to as a field and transform graph (FTG). However, other data structures may be used to represent or indicate systems of an SoS, the availability of communications between pairs of systems of an SoS, and available transforms for messages exchanged between systems of an SoS for inter-system communication protocol sessions. Such other data structures may include other types of graphs, non-directed graphs, tables, lists, databases, etc.

FIG. 1B illustrates only one example of a data structure 110 that represents a corresponding example communication topology of nodes 106 (systems) of an SoS; this communication topology is also depicted in FIG. 1B by proximate reference characters for node 106 for fields 112.

As noted above, multipath equivalence may be helpful for ensuring interoperability of SoSs. According to techniques of this disclosure, path verifier 102, and more particularly processing circuitry 104, of system 100 may verify whether all paths of a plurality of paths are equivalent up to an equivalence relation (e.g., commutativity) using data structure 110. Processing circuitry 104 may perform a search to identify a plurality of paths from a source field (represented by a node of data structure 110) to a destination field (represented by another node of data structure 110). Processing circuitry 104 may apply a path computation algorithm, such as a depth-first search (described with respect to FIG. 5), Dijkstra, or Bellman-Ford algorithm, to identify paths from a source node to a destination node.

In some examples, processing circuitry 104 may search a previously-generated index to identify the plurality of paths from a source node to a destination node. To create the index, processing circuitry 104 may identify and store the paths from each node to any other node. This is described in greater detail with respect to FIG. 4. Processing circuitry 104 may then index the stored paths by source node, destination node, or a combination of source node and destination node.

Processing circuitry 104 may convert, for each path of the plurality of paths, transforms (e.g., transforms 114) represented by corresponding edges of each path to a sequence of transforms that conform to a solver format (e.g., a format which a satisfiability solver, such as a satisfiability modulo theory (SMT) solver, can parse into one or more logical statements). In some examples, converting the transforms represented by corresponding edges of each path to the sequence of transforms may include expressing the sequence of transforms as a composition of transforms in a programming language format, such as a domain-specific language (DSL) format. Converting transforms represented by corresponding edges of each path to the sequence of transforms may further include translating the composition of transforms from the programming language format to the solver format by expanding a definition of each transform in the composition of transforms. Techniques for converting transforms represented by corresponding edges of each path to a sequence of transforms that conform to a solver format are described in greater detail below with respect to FIGS. 2 and 5.

Processing circuitry 104 may process the sequence of transforms for each path to determine whether the paths of the plurality of paths are equivalent up to an equivalence relation. For example, processing circuitry 104 may determine that the paths are equivalent up to an equivalence relation if applying the respective sequences of transforms for the paths to a message results in exactly the same expression of the message. Additionally, processing circuitry 104 may determine that the paths are equivalent up to an equivalence relation if applying the respective sequences of transforms for the paths to a message results in different expressions of the message, but the different expressions of the message are nevertheless equivalent per an equivalence relation, such as commutativity.

As such, the notion of equivalence used herein can be exact equivalence or can be generalized to equivalence up to some equivalence relation. An equivalence relation (i.e., "≡") is a reflexive, symmetric, and transitive binary relation. For instance, for all elements x, y, and z, an equivalence relation has that x≡x, and if x≡y, then y≡x, and if x≡y and y≡z, then x≡z. Exact equality is one example of an equivalence relations. An equivalence relation implicitly defines partitions of a set into groups where the difference between elements within a partition are unimportant. One example is numeric equivalence modulo some integer, as in clock time equivalence. In clock time equivalence, two times may be considered equivalent if they are the same or differ by a multiple of 12 hours (e.g., 7 o'clock is equivalent to 19 o'clock is equivalent to 31 o'clock).

Techniques described herein may be applied to determine if the sequence of (one or more) transforms for each path of a plurality of paths are exactly equivalent, or they can be applied to determine if the paths are equivalent up to some more general equivalence relations. Equivalence relations of interest in SoSs can include numeric equivalence up to some modular arithmetic (often computer hardware CPUs and networks have limited number of bits of representation, so modulo some power of two such as 2^32 for 32-bit busses can be useful), order-independence (different orders of elements in some list may be considered equivalent), and associativity-independence (lists of lists may be considered equivalent if they have the same sets of atomic elements).

In some examples, processing circuitry 104 may process the sequence of transforms for each path using a satisfiability solver, such as a SMT solver. The satisfiability solver may be configured to evaluate an assertion that the sequence of transforms for each path is equivalent (up to an equivalence relation), in other words, that the paths are equivalent and can thus equivalently transform a source field to a destination field. Responsive to the satisfiability solver determining that the paths of the plurality of paths are equivalent, processing circuitry 104 may output an indication that the assertion is satisfied. Responsive to the satisfiability solver determining that the paths of the plurality of paths are not equivalent, processing circuitry 104 may output an indication that the assertion is not satisfied. Techniques for processing the sequence of transforms for each path using a satisfiability solver are described in greater detail below with respect to FIG. 2. In some examples, each field of a path may include a canonicalizing transform that defines the equivalence relation such that a first path is equivalent to a second path if a canonical form of the first path is the same as a canonical form of the second path.

Figure 2:
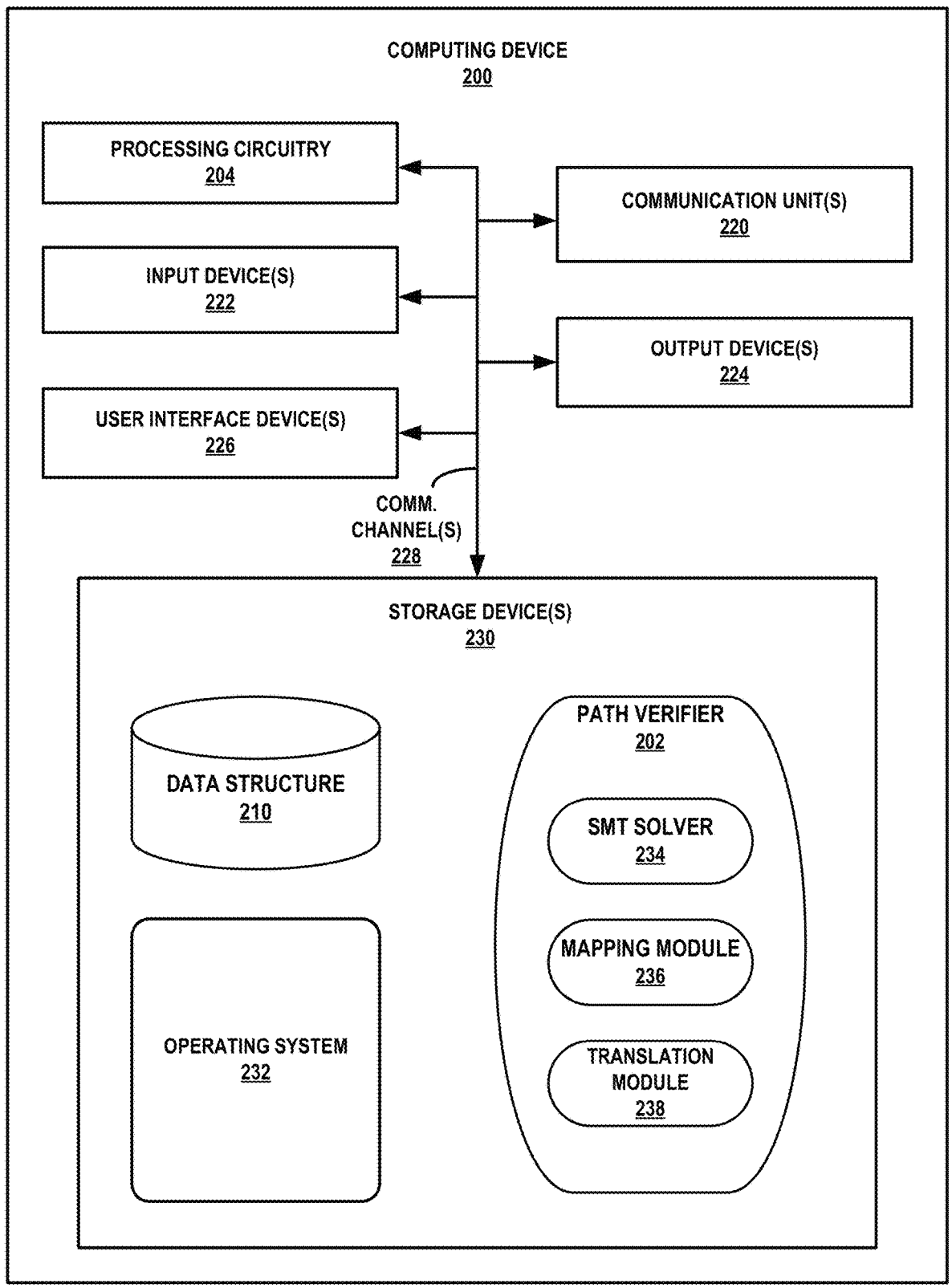
FIG. 2 is a conceptual diagram illustrating an example system for verifying path equivalence, in accordance with the techniques of the disclosure.

FIG. 2 is a block diagram illustrating an example system, for example, computing device 200, for verifying multipath equivalence, in accordance with the techniques of the disclosure. FIG. 2 may illustrate a particular example of a server or other computing device 200 that includes processing circuitry 204 for executing at least a portion of path verifier 202, or any other computing device described herein. Other examples of computing device 200 may be used in other instances. Although shown in FIG. 2 as a stand-alone computing device 200 for purposes of illustration, a computing device may be any component or system that includes processing circuitry or other suitable computing environment for executing software instructions and, for example, need not necessarily include one or more elements shown in FIG. 2 (e.g., computing device 200 may not include communication units 220 and/or user interface devices 226 ("UI devices 226"); and in some examples components such as storage device(s) 230 may not be collocated or in the same chassis as other components). Computing device 200 may be located and execute, for example, at another interconnection facility, or at a branch office or cloud computing environment employed or used by a colocation facility or cloud exchange provider.

As shown in the specific example of FIG. 2, computing device 200 includes processing circuitry 204, one or more communication units 220, one or more input devices 222, one or more output devices 224, one or more UI devices 226, and one or more storage devices 230. Computing device 200, in one example, further includes path verifier 202 and operating system 232 that are executable by computing device 200. Path verifier 202 may represent applications, processes, libraries, or other executable code. Each of components 204, 220, 222, 224, 226, and 230 are coupled (physically, communicatively, and/or operatively) for inter-component communications. In some examples, communication channels 228 may include a system bus, a network connection, an inter-process communication data structure, or any other method for communicating data. As one example, components 204, 220, 222, 224, 226, and 230 may be coupled by one or more communication channels 228.

Processing circuitry 204, in one example, is configured to implement functionality and/or process instructions for execution within computing device 200. For example, processing circuitry 204 may be capable of processing instructions stored in storage device 230. Examples of processing circuitry 204 may include any one or more of a microprocessor, a controller, a digital signal processor (DSP), an application specific integrated circuit (ASIC), a field-programmable gate array (FPGA), or equivalent discrete or integrated logic circuitry.

Computing device 200, in some examples, includes one or more communication units 220. Computing device 200, in one example, utilizes communication units 220 to communicate with external devices via one or more networks, such as one or more wired/wireless/mobile networks. Communication units 220 may include a network interface card, such as an Ethernet card, an optical transceiver, a radio frequency transceiver, or any other type of device that can send and receive information. Other examples of such network interfaces may include 3G, 4G, 5G, Bluetooth™, IEEE 802.15.4 (e.g., ZigBee™), and Wi-Fi™ radios. In some examples, computing device 200 uses communication unit 220 to communicate with an external device.

One or more output devices 224 may also be included in computing device 200. Output device 224, in some examples, is configured to provide output to a user using tactile, audio, or video outputs or stimuli. Output device 224, in various examples, includes a presence-sensitive display, a sound card, a video graphics adapter card, or any other type of device for converting a signal into an appropriate form understandable to humans and/or machines. Additional examples of output device 224 include a speaker, a cathode ray tube (CRT) monitor, a liquid crystal display (LCD), or any other type of device that can generate intelligible output to a user.

Computing device 200, in various examples, also includes one or more UI devices 226. UI devices 226, in some examples, are configured to receive input from a user through tactile, audio, or video feedback. Examples of UI devices(s) 226 include a presence-sensitive display, a mouse, a keyboard, a voice responsive system, video camera, microphone or any other type of device for detecting a command from a user. In some examples, a presence-sensitive display includes a touch-sensitive screen.

One or more storage devices 230 may be configured to store information, such as a data structure 210, within computing device 200 during operation. Storage device 230, in some examples, is described as a computer-readable storage medium. In some examples, storage device 230 is a memory device, meaning that a primary purpose of storage device 230 is not long-term data storage. Storage device 230, in some examples, is described as a volatile memory, meaning that storage device 230 does not maintain stored contents when the computer is turned off. Examples of volatile memories include random access memories (RAM), dynamic random access memories (DRAM), static random access memories (SRAM), and other forms of volatile memories known in the art. In some examples, storage device 230 is used to store program instructions for execution by processing circuitry 204. Storage device 230, in one example, is used by software or applications running on computing device 200 to temporarily store information during program execution.

Storage devices 230, in some examples, also include one or more computer-readable storage media. Storage devices 230 may be configured to store larger amounts of information than volatile memory. Storage devices 230 may further be configured for long-term storage of information. In some examples, storage devices 230 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 200 may include operating system 232. Operating system 232, in some examples, controls the operation of components of computing device 200. In various examples, operating system 232 may facilitate the communication of path verifier 202 with processing circuitry 204, communication unit 220, storage device 230, input device 222, output device 224, and UI device 226.

Path verifier 202 may include program instructions and/or data that are executable by computing device 200. For example, path verifier 202 may include instructions that cause computing device 200 to verify multipath equivalence using satisfiability solver 234 ("SMT solver 234"). SMT solver 234 may represent an automated reasoning tool (e.g., Yices SMT solver, dReal solver, etc.) that solves problems that can be encoded as logic formulas over real numbers. In some examples, SMT solver 234 may determine the satisfiability of formulas containing uninterpreted function symbols with equality, real and integer arithmetic, bitvectors, scalar types, and tuples. SMT solver 234 may support both linear and nonlinear arithmetic.

In general, SMT solver 234 may be used for verification, proving the correctness of programs, software testing based on symbolic execution, etc. In some examples, postconditions, loop conditions, and assertions expressed in a programming language format may be converted into a solver format, such as SMT formulas that enable the modeling of datapath operations of one or more processors at the word rather than the bit level. In any case, the solver format may allow for the expression of logical statements or constraints about which SMT solver 234 can reason. For example, SMT solver 234 may evaluate SMT formulas in order to determine if all properties (e.g., the postconditions, loop conditions, and assertions) hold (i.e., are logically consistent). If all the properties do not hold, then, in some examples, SMT solver 234 may generate counterexamples that exemplify the violated properties, which may help with identifying errors in programs.

Data structure 210 is stored in storage device(s) 230. Data structure 210 may be generated by determining available communication protocol sessions between pairs of systems of an SoS, determining applicable message formats for the communication protocol sessions, determining available transforms that can be applied by each of the systems, creating nodes from the message formats, and connecting the nodes with edges that represent transforms that can be applied by the systems for transcoding between message formats for different communication protocol sessions. Data structure 210 may manually be generated by an operator or developer of an SoS, or automatically by an analysis system that queries each of the systems for transform capabilities and communication protocol sessions, for example.

As shown in FIG. 2, path verifier 202 includes a mapping module 236. Mapping module 236 may be configured to execute one or more algorithms for identifying all paths in data structure 210 from a source node (representing a field) to a destination node (representing another field). Mapping module 236 is described in greater detail with respect to FIG. 4.

As further shown in FIG. 2, path verifier includes a translation module 238. Translation module 238 may be configured to translate composition of transforms in a programming language format, such as a DSL format, into a solver format that SMT solver 234 may evaluate to verify if all the properties hold.

Techniques for determining multipath equivalence of a field and transform graph (FTG) (which may be an example of data structure 210) are discussed in the following. Although primarily described herein with respect to STITCHES, an example DSL, and Yices, an example satisfiability solver, it should be understood that the techniques of this disclosure may be implemented with other DSLs and other satisfiability solvers. Thus, a person of ordinary skill should consider such implementations as also within the spirit and scope of this disclosure.

A FTG may define a set of fields (e.g., fields 112) which can be thought of as data structures or message formats, and transforms (e.g., transforms 114) that map fields to other fields. A field may include a finite set of subfields and optionally a set of properties that constrain the values of these subfields.

A FTG can include several types of transforms. Stateless transforms are functions that construct an output field from one or more input fields. Synchronizing transforms are programs that maintain a state, update the state based on message they receive, and produce output messages. Below is a simple example written in a DSL:

```
field Simple.Message2 {
   A: int32
   B: int32
}
property checkB {
   B <= 0
}
property checkA {
   A > 0
}
transform transform1To2(input:SimpleMessage1):Simple.Message2 {
   if (input.X > 0) {
      A = 1;
      B = -1 * input.X;
   } else {
      A = 2;
      B = input.X;
   }
}
```

This example defines a field with two integer components A and B. The two properties require A to be positive and B to be negative or zero. The transform takes a single input of type SimpleMessage1 and constructs, from the input, a message of type Simple.Message2. The transform ensures that the result satisfies the two properties checkA and checkB. One function of path verifier 202 is to verify that the transforms satisfy this criterion: when given input that satisfies properties of the input field(s), the transforms must produce an output that satisfies properties of the output field.

The FTG definition document lists four well-formedness criteria that an FTG is able to satisfy: (1) stateless transforms are well typed; (2) synchronizing transforms are well typed; (3) transform cycles are identities; and (4) paths with the same end points are equivalent up to an equivalence relation. It is possible to statically check that these criteria are satisfied. Two examples of properties that path verifier 202 supports are the following: (1) valid implies valid is the same as stateless transforms that are well typed; and (2) multipath equivalence covers two well-formedness criteria: (i) cycles are identities, and (ii) paths with the same end points are equivalent up to an equivalence relation.

As part of valid implies valid, SMT solver 234 may perform a related well-formedness check for FTG properties and FTG filters. SMT solver 234 may check whether a property or filter is always true (meaning that the property or filter is redundant) or always false (meaning that the property or filter is erroneous). SMT solver 234 may check these properties by converting them to satisfiability modulo theories problems and checking them. Responsive to properties being violated, SMT solver 234 may produce a counterexample that is displayed or otherwise outputted to the user to help debug the FTG.

Translation module 238 may translate DSL into a solver format, such as SMT theory. In an example, translation module 238 translates the DSL to the SMT theory of fixed size bit-vectors (known as QF_BV). The subset of the DSL that is encoded in this theory can be supported. DSL features such as variable and function declarations, conditionals, and block structures can also be supported. Further, fields, including optional subfields, and operations such as field constructors and explicit calls to transforms can also be supported.

For example purposes only, Table 1 below shows the correspondence between primitive STITCHES types and Yices types. STITCHES is an example DSL, and Yices is an example satisfiability solver. Most DSL types are compiled to bit-vectors of different sizes with the exception of double (which are represented as real numbers in Yices), Booleans, and strings. An abstract representation of strings was used, that is, strings were represented as objects of an uninterpreted type in Yices. In the SMT terminology, an uninterpreted type is just an infinite collection of objects and the only operation defined on an uninterpreted type is comparison for equality.

TABLE 1

Conversion of primitive STITCHES types to Yices

| STITCHES types | Yices types |
| --- | --- |
| int8/uint8/byte | (bitvector 8) |
| int16/uint16 | (bitvector 16) |
| int32/uint32/int | (bitvector 32) |
| int64/uint64 | (bitvector 64) |
| double | real |
| boolean | bool |
| bit | (bitvector 1) |
| char | (bitvector 8) |
| string | uninterpreted type |

The conversion is exact for the integer types, characters, Booleans, and bit. The conversion may be approximate for double and strings. Yices and other SMT solvers may use a Lisp-like syntax for types and expressions. For example, f(x) is written (fx) in Yices and so forth. In Table 1, (bitvector n) means vectors of n bits. More information pertaining to Yices specification language may be found in the Yices manual.

There is good support for fixed-sized arrays of bits and bytes; these can be converted to bit-vector types in Yices. For example, the DSL type bit[12] is represented as (bitvector 12) in Yices and byte[6] as (bitvector 48). DSL array operations can be converted to equivalent operations (e.g., shift and extract bit-vector slices) in Yices.

A similar encoding can be used for variable-size arrays: bit[:m] can be converted to (bitvector m) and byte[:m] to (bitvector 8m). This means that an array of at most m elements is then represented in Yices as an array of exactly m elements. The actual array length is tracked separately, and smaller arrays can be extended to the maximal size (using zero-extension). There may be some limitations to this encoding. For example, the largest bit-vector size supported by Yices may be smaller than the largest array size allowed in the DSL. In another example, Bit-vectors of size 0 are not allowed in Yices, so empty arrays (of zero elements) cannot be represented. These situations may be rare so it may make sense to just check for them and report an error if they occur.

Currently arrays of other basic types (e.g., arrays of int32) are represented using the SMT notion of arrays (with integer indices). This encoding is less precise as the array indices in SMT are allowed to be arbitrary integers (including negative integers) and many array STITCHES operations (such as concatenation) are not defined on SMT-style arrays.

A field type in a DSL may comprise different subcomponents whose type can be a primitive type, another field type, or an array. Some of these components may be optional. Such field types were converted to the Yices notion of tuple type. In simple cases, a field type F with n components is represented by a Yices tuple type with the same number of components. For example, the field

```
field Simple.Message2 {
   A: int32
   B: int32
}
``` is translated to the following Yices type:

(define-type Simple.Message2 (tuple (bitvector 32) (bitvector 32)))

This simply means that an object of type Simple.Message2 is a pair of 32-bit bitvectors.

The first element in this pair represents the component A and the second element represents component B. Two accessor functions were then defined in Yices that extract the A and B component of a pair as follows:

(define A::(->Simple.Message2 (bitvector 32))
(lambda (x::Simple.Message2 (select x 1)))
(define B::(->Simple.Message2 (bitvector 32))
(lambda (x::Simple.Message2 (select x 2)))

The encoding is more complex when field components are arrays or are optional. When a field component has array type, an extra tuple component is created in Yices to denote the length of the array. When a field component is optional, an extra Boolean component is created in Yices that encodes whether or not the field is present. For example, for a field

```
field X {
  data: optional byte[12];
}
``` the following Yices definitions are used:

(define-type X (tuple (bitvector 96) int bool))
(define data::(->X (bitvector 96)) (lambda (x::X) (select x 1)))
(define data!length::(->X int) (lambda (x::X) (select x 2)))
(define data!present::(->X bool) (lambda (x::X) (select x 3)))

Thus, if x is an object of type X, then (data!present x) is true if the optional component data is present in x. If so, (data!length x) denotes the length of the array, and (data x) denotes the array itself. As discussed previously, the array of 12 bytes is represented as a bitvector of 96 bits in Yices.

An extra complication occurs for empty fields, i.e., fields with no subcomponents. These are allowed in STITCHES and do occur in some FTGs, but Yices does not allow empty tuples. A slightly different encoding is used in this case by introducing a dummy component in the Yices tuple type.

Functions and program statements in the DSL are converted to expressions and formulas in Yices. The translation is straightforward for basic program constructs (e.g., integer arithmetic and comparisons) as corresponding constructs are present in the bitvector arithmetic theory supported by Yices. Boolean are also easily converted to Yices.

There is support for certain array operations. Because DSL bit and byte arrays are represented as bit-vectors in Yices, there is reasonable coverage for operations that involve such arrays. For example, array slices and array concatenation can be supported by translation to bitextraction and bit-vector concatenation.

A limitation that may apply to all arrays is the use of complex operations that iterate over an array such as the Map and Filter constructs.

Assign statements are discussed in the following. A simple assign statement is of the form:

X=Assign(Y)

where X and Y are two variables of field type $F_x$ and $F_y$, respectively. The assignment is implemented by searching for a path of (single-input) transforms in the FTG that starts from node $F_x$ and reaches node $F_y$ and composing the transforms along this path:

$F_x \rightarrow F_1 \rightarrow F_2 \rightarrow \ldots \rightarrow F_y$.

To convert assign statements to Yices, three steps are followed: (1) the FTG is queried to construct the path above; (2) the path is expressed as a DSL expression; and (3) the DSL expression is converted (i.e., translated) to Yices.

Figures 3A, 3B:
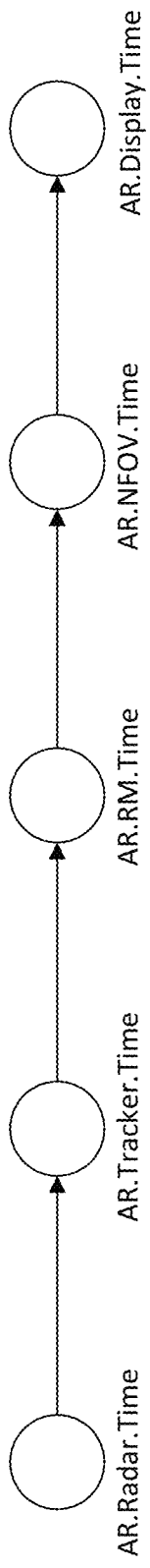
FIG. 3A is a conceptual diagram illustrating an example path of a data structure in accordance with techniques of the disclosure.
FIG. 3B is an example expression of the path of FIG. 3A as a DSL expression in accordance with techniques of the disclosure.

FIG. 3A is a block diagram illustrating a path, and FIG. 3B is the expression of the path as a DSL expression, in accordance with techniques of this disclosure. The expression of the path as a DSL expression may be a DSL-to-DSL conversion that replaces an assign statement with a composition of explicit transforms. The translation to Yices can then proceed by expanding the definition of the transform involved. More complex cases such as assign statements applied to arrays or to optional fields are handled in a similar manner but produce more complex expressions.

Resolving Assign statements as described previously introduces explicit calls to transforms. Such calls can also be present in original DSL code. To process them, a DSL-to-DSL rewriting approach may again be used: the transform body is first converted to a field constructor expression then translates that expression to Yices. For example, here is a transform definition:

```
transform transform1To2 (input: SimpleMessage1): Simple.Message2 {
  if (input.A == 1) {
    X= -1 * input.B;
  } else
    X= input.B;
  }
}
```

The following DSL fragment calls the previous transform:

let aux: Simple.Message1=
Simple.Message1::transformExampleMessage2To1(m);

When translating this call to Yices, the transform body can be expanded as follows:

let aux: Simple.Message1=
(m.A==1)? Simple.Message1{X=-1*m.B}
: Simple.Message1{X=m.B};

This rewriting introduces two field constructors (one for each branch of the conditional statement), which can then be converted to Yices tuples.

Checking the valid implies valid criterion is discussed in the following. Given the previous translation from DSL to Yices, it is relatively straightforward to check whether transforms satisfy the valid implies valid criterion. Schematically, for every transform, satisfiability of the following formula is checked:

$$P(x) \wedge T(x,y) \wedge \neg Q(y),$$

Where x denotes the transform's input variables, y denotes the output variables, P(x) encodes properties on the input field(s), Q(y) encodes properties on the output field, and T(x,y) defines the transform.

If the formula is satisfiable, then Yices produces a model. The model is a pair $(x_0, y_0)$ such that $x_0$ satisfies the input properties, $y_0$ is the output produced by the transform input $x_0$, and $y_0$ does not satisfy the output properties. This means that valid implies valid does not hold for this transform and the input $x_0$ is a counterexample.

Checking multipath equivalence is discussed in the following. As described previously, assign statements are resolved by searching for chains of transforms in the FTG that start from a field $F_x$ and reach a field $F_y$. There may be several such chains, that is, several paths in the FTG that start from $F_x$ and reach $F_y$. Multipath equivalence is a consistency property. It requires all these paths to be equivalent up to an equivalence relation: they should all define the same function from $F_x$ to $F_y$.

Figure 4:
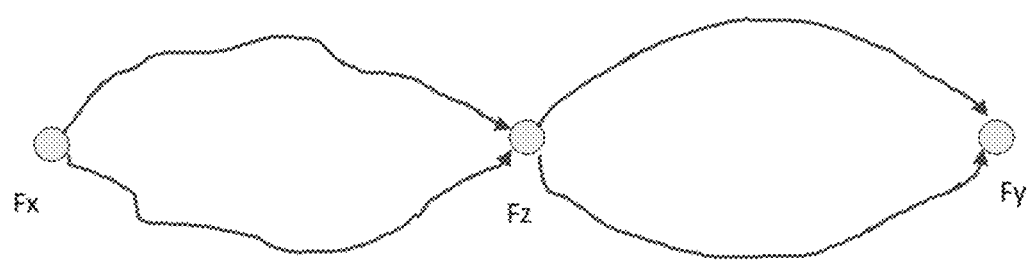
FIG. 4 is a conceptual diagram illustrating an example of paths from $F_x$ to $F_y$ via a common intermediate field $F_z$ in accordance with the techniques of the disclosure.

To verify whether this property holds on a given FTG, path verifier 202 may check equivalence between paths that do not have any node in common other than the source $F_x$ and destination $F_y$. If the property holds for all such pairs of paths then it also holds for arbitrary paths, as illustrated in FIG. 4. If all paths from $F_x$ to $F_z$ are equivalent up to an equivalence relation and all paths from $F_z$ to $F_y$ are equivalent up to an equivalence relation, then two paths from $F_x$ to $F_y$ that go through $F_z$ are also equivalent up to an equivalence relation by transitivity.

Figure 5:
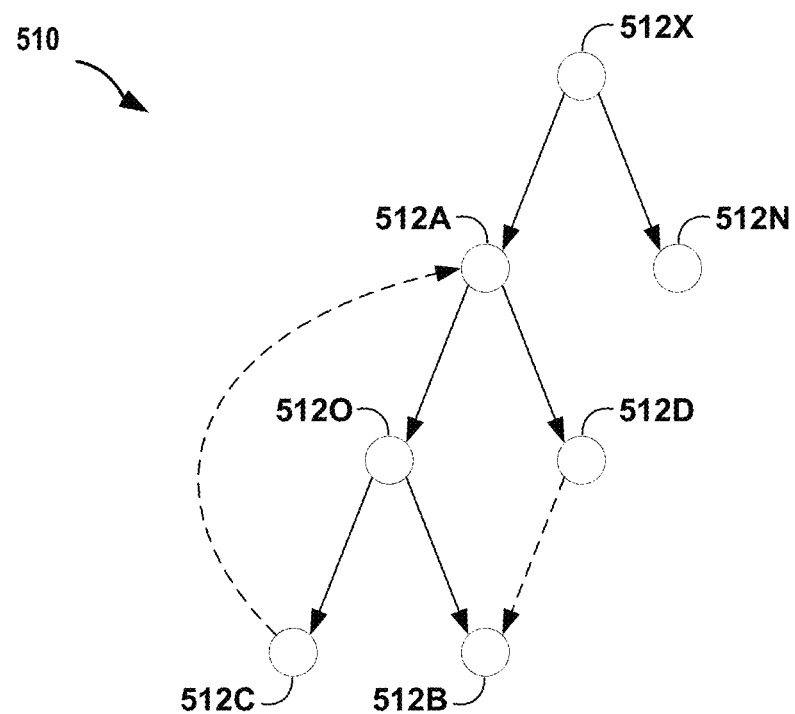
FIG. 5 is a conceptual diagram illustrating an example depth-first search algorithm for exploring a data structure in accordance with the techniques of this disclosure.

FIG. 5 is a conceptual diagram illustrating an algorithm for exploring an example data structure, such as data structure 210. As shown in FIG. 5, a depth-first search in FTG 510 may be used to compute the relevant paths comprising one or more of fields 512A-D, 512N-O, and 512X (collectively, "fields 512"). As an example, mapping module 236 may start from a field 512X and explore FTG 510 depth-first, keeping track of all visited fields. This builds a tree that stores paths from field 512X to all fields in FTG 510 that are reachable from field 512X. When this tree is constructed, any transform that reaches a previously visited node yields two convergent paths.

Two examples of a depth-first search are shown in FIG. 5. First, the dashed arrow from field 512D reaches field 512B that is already in the tree. The common ancestor of field 512B and field 512D in the tree is field 512A, so two paths from field 512A to field 512B have been found that have no other fields in common. FIG. 5 also shows a special case of convergence where one path is a cycle. The dashed arrow from field 512C reaches field 512A, which has already been visited. The common ancestor of field 512A and field 512C in the tree is field 512A itself. Thus, two paths from field 512A to field 512A have been identified: one is the cycle from field 512A to field 512A via field 512C, and the other is the empty path. The cycle from field 512A to field 512A via field 512C must be equivalent to the empty path; it must compute the identity function.

Example code for implementing the depth-first exploration exemplified by FIG. 5, and which may be executed by path verifier 202, is as follows:

```
private void dfs( ) {
    while (!stack.isEmpty( )) {
        StackElem top = stack.getLast( );
        if (top.toVisit.hasNext( )) {
            FieldName nodeName = top.nodeName;
            TransformDefSIT nextEdge = top.toVisit.next( );
            FieldName source = nextEdge.getSingleSrc( ).getFieldType( );
            if (visited(source)) {
                // already seen: a re-convergent path has been found
                FieldName ancestor = commonAncestor(nodeName, source);
                TransformPath path1 = getPath(source, ancestor);
                TransformPath path2 = getPath(nodeName, ancestor);
                path2.addFirst(source, nextEdge);
                store.addPath(path1);
                store.addPath(path2);
            } else {
                //keep exploring
                pushNode(source, nodeName, nextEdge);
            }
        } else {
            // all successors of the top element have been visited
            stack.removeLast( );
        }
    }
}
```

The code uses a stack to keep track of the current branch in the tree and a store to collect the reconvergent paths. For technical reasons, the FTG was explored in reverse order, starting with field 512X, and finding all paths that reach field 512X. The store is a set of paths indexed by source and destination. To fully explore the FTG, the depth-first search procedure may be run by path verifier 202 multiple times, using a different field as a root each time. This may cause the same convergent paths to be discovered several times. The store uses a hash set to avoid storing multiple copies of the same path.

Paths are considered equal if they have the same start and end fields and if all transforms along the path are equal. A cycle of N fields may be recorded N times in the store because the cycle can be cut at N different fields, and each cut may require one equivalence check.

The result of the exploration is a set of paths in the FTG. The paths with same origin and destination are grouped together in the store. To check equivalence, a base path (see FIG. 6) in each group is selected and all other paths (see FIG. 6 "Other path") in the same group compute the same function as the base path is confirmed. For efficiency, the shortest path in the group may be chosen as the base path.

Figure 6:
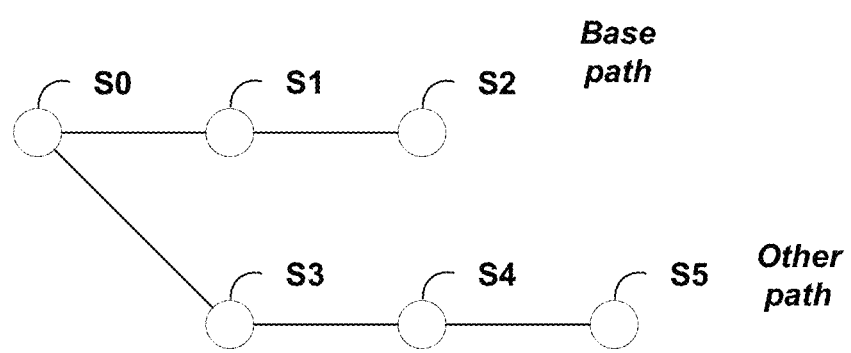
FIG. 6 is a conceptual diagram illustrating an example procedure for verifying path equivalence.

FIG. 6 is a conceptual diagram illustrating a procedure for verifying multipath equivalence. The procedure may rely on the conversion from a programming language format (e.g., DSL) to a solver format (e.g., Yices) discussed previously. A common source field, for example S0, may be created, for a set of paths. The sequence of transforms may be converted to Yices. Each transform may be converted to a Boolean term relating the transform's input and output. Then it can be asserted that the end-points of both paths are the distinct (e.g., assert that field S2 field S5). For the example of FIG. 6 with two paths having transforms T and U, this results in a formula of the form:

$$T_1(S0,S1) \wedge T_2(S1,S2) \wedge U_1(S0,S3) \wedge U_2(S3,S4) \wedge U_3(S4,S5) \wedge S2 \neq S5$$

If this formula is satisfiable, then the two paths are not equivalent, and Yices may provide a counterexample. Path verifier 202 may output an indication of whether or not the paths are equivalent up to an equivalence relation, and in some cases may output the counterexample as an explanation to the user.

Figure 7:
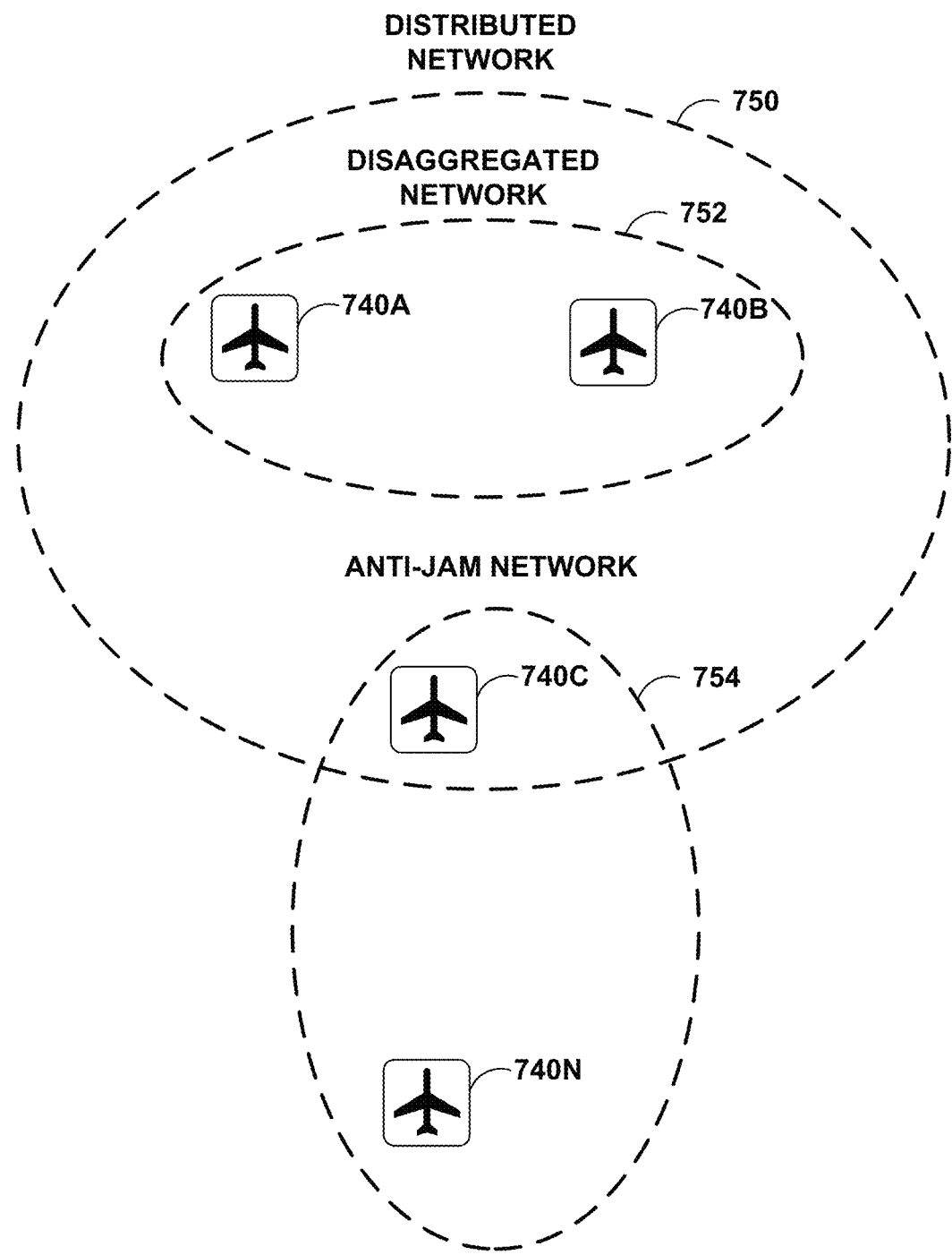
FIG. 7 is a conceptual diagram illustrating a first example use case in accordance with the techniques of the disclosure.

FIG. 7 is a conceptual diagram illustrating a first example use case in accordance with the techniques of the disclosure. FIG. 7 is described with respect to FIGS. 1-6 for example purposes only. In this example, an airplane 740A may exchange, via a distributed network 750, data with airplanes 740B, 740C using a first message format. In this example, airplane 740A may exchange, via a disaggregated network 752, data with airplane 740B using a second message format. Airplane 740C may exchange, via an anti-jam network 754, data with airplane 740N using third message format.

Rather than configuring airplanes 740A-740N (collectively, "airplanes 740") to exchange data using a single message format (e.g., only the first message format) or configuring each of airplanes 740 to support all message formats (e.g., by employing a translation tool) used by airplanes 740, message formats may be converted from one to another in accordance with a FTG (e.g., data structure 110). For example, a first message format may be converted into a second message format through the application of a sequence of transforms to the first message format. As discussed throughout this disclosure, path verifier 102 may verify multipath equivalence, in this way reducing errors in the FTG and thereby helping improve the consistency of the message format conversions. As such, the first message format may be employed for exchanging data via disaggregated network 752, converted into a second message format satisfying message formatting requirements of disaggregated network 752, and converted into a third message format satisfying message formatting requirements of anti-jam network 754.

Figure 8:
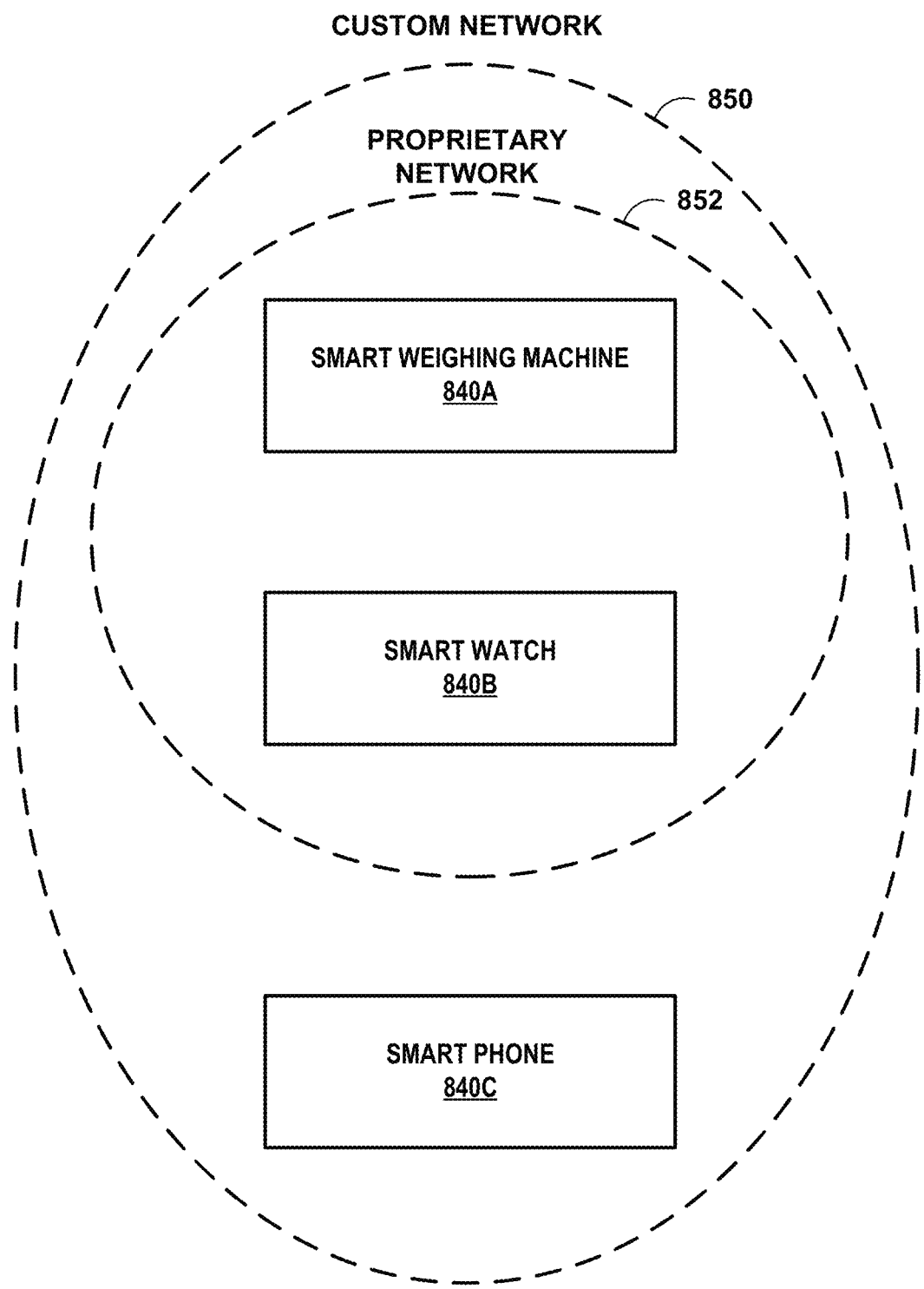
FIG. 8 is a conceptual diagram illustrating a second example use case in accordance with the techniques of the disclosure.

FIG. 8 is a conceptual diagram illustrating a second example use case in accordance with the techniques of the disclosure. FIG. 8 is described with respect to FIGS. 1-6 for example purposes only. In this example, a smart phone 840C may exchange, via a custom network 850, data with a smart weighing machine 840A and a smart watch 840B using a first message format. In this example, smart weighing machine 840A may exchange, via a proprietary network 852, data with smart watch 840B using a second message format.

Rather than configuring smart weighing machine 840A, smart watch 840B, and smart phone 840C to exchange data using a single message format (e.g., only the first message format or the second message format) or configuring each of smart weighing machine 840A, smart watch 840B, and smart phone 840C to support all protocols used (e.g., the first message format and the second message format), smart weighing machine 840A, smart watch 840B, and smart phone 840C, smart weighing machine 840A, smart watch 840B, and smart phone 840C may each continue using their message format, and the message formats may be converted from one to another in accordance with a FTG (e.g., data structure 110).

Updates to a FTG are usually small additions or changes and do not affect many paths. Rather than a global and non-incremental approach, a more incremental approach may be desirable to avoid recomputing paths and re-exploring fields that are not affected by a change. Accordingly, incrementally checking equivalence between paths in a FTG is discussed in the following.

As noted above, a FTG may represent a directed graph whose vertices are fields and edges are single-input transforms. A field defines a data type. A transform defines a mapping from a source field F to a destination field G. The transform describes how to convert an object of type F into an object of type G. More generally, a path $\pi$ in the FTG from a field F to a field G defines a conversion from F to G obtained by sequentially applying transforms along the path.

Given two fields F and G, there may be distinct paths $\pi_1$ and $\pi_2$ of source F and destination G. Well-formedness of an FTG requires all these paths to be equivalent up to an equivalence relation (e.g., composing the transforms along path $\pi_1$ defines an equivalent function as composing the transforms along path $\pi_2$, up to an equivalence relation).

To verify this path equivalence property, it is sufficient to check equivalence between paths that do not have vertices in common other than their source and destination. If the property holds for all such pairs of paths then it also holds for arbitrary paths, as illustrated in FIG. 4. If all paths from $F_x$ to $F_z$ are equivalent up to an equivalence relation and all paths from $F_z$ to $F_y$ are equivalent up to an equivalence relation, then two paths from $F_x$ to $F_y$ that go through $F_z$ are also equivalent up to an equivalence relation by transitivity.

A depth-first search of the FTG (e.g., as illustrated and described with respect to FIG. 5) is not incremental and may require revisiting the whole FTG whenever a new field or transform is added. An incremental method may avoid visiting the full graph with every update. As noted above, a FTG is well-formed if it satisfies the path equivalence property for all pairs of fields. Assuming that FTG G is well-formed, updates to G may create a new FTG G' by adding edges or vertices to G. The basic case is the addition of a single transform T from a field A to a field B, where A and B may be fields that exist in G or new fields.

It is also possible that updates to G include removal of edges or vertices. Such updates are problematic since they could potentially break applications that use G. From the pure well-formedness aspect, removing fields or transforms is safe, as any subgraph of a well-formed graph is also well-formed. However, to support incremental checking, mapping module 236 may store information about the graph topology to allow path verifier 202 to quickly determine whether two fields A and B are connected in G and to construct a path from A to B if they are.

As an example, a transform T from A to B to a well-formed graph G. Whether G∪{T} is well-formed may be checked. Two cases may be possible: (1) there is a path $\pi$ from A to B in G; (2) there are no paths from A to B in G. In the first case, it is sufficient to check whether T and $\pi$ are equivalent up to an equivalence relation. If they are, then G∪{T} is well-formed. This follows immediately from the fact that G is well-formed. In this case, a single equivalence check is sufficient and the choice of path $\pi$ from A to B is arbitrary.

Figure 9A:
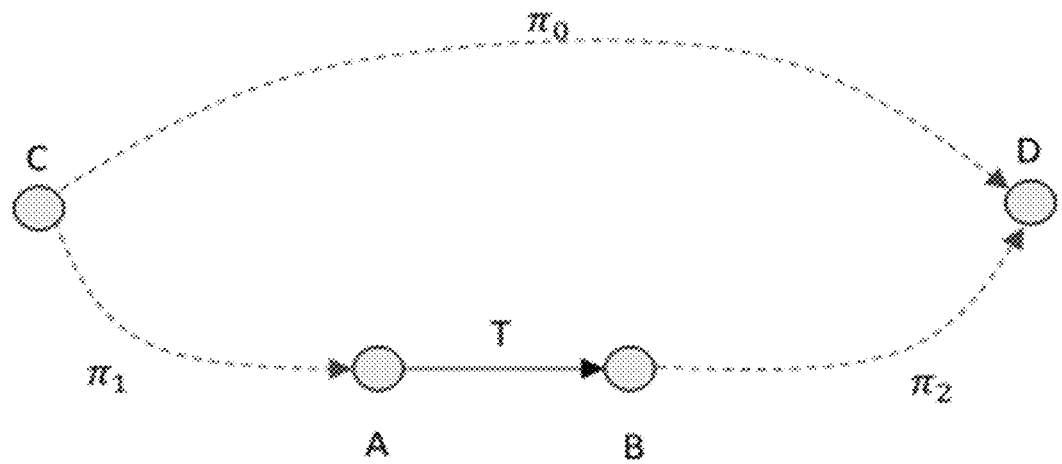
FIG. 9A is a conceptual diagram illustrating an example of a well-formed data structure with an added transform.

As shown in FIG. 9A, mapping module 236 may search for new paths that go through the new transform T and check whether these paths are equivalent up to an equivalence relation to existing paths in G. To check that G∪{T} is well-formed, mapping module 236 may search for fields C and D that satisfy the following constraints:

There is a path $\pi_1$ from C to A in G
There is a path $\pi_2$ from B to D in G
There is a path $\pi_0$ from C to D in G A pair (C, D) is relevant to T. For any such pair, mapping module 236 may check whether the path $\pi_1 T \pi_2$ is equivalent up to an equivalence relation to the path $\pi_0$. If this equivalence holds for all every relevant pair of fields, then the graph G∪{T} is well-formed.

An example algorithm for finding the relevant pairs is to compute the set P(A) of predecessors of A (i.e., all fields that can reach A) and the set S(B) of successors of B (all fields reachable from B), which can be done by depth-first search. Then, mapping module 236 can examine all pairs (C, D) where C∈P(A) and D∈S(B) and check whether there is a path from C to D in G. In such a case, the pair (C, D) is relevant.

The fact that G is well-formed provides opportunities for optimization. First, given a pair (C, D) as in the previous example, there may be several choices for the paths $\pi_0$, $\pi_1$, and $\pi_2$. Since G is well-formed, mapping module 236 may not need to examine all possibilities. It is enough to check path equivalence for only one choice.

Figure 9B:
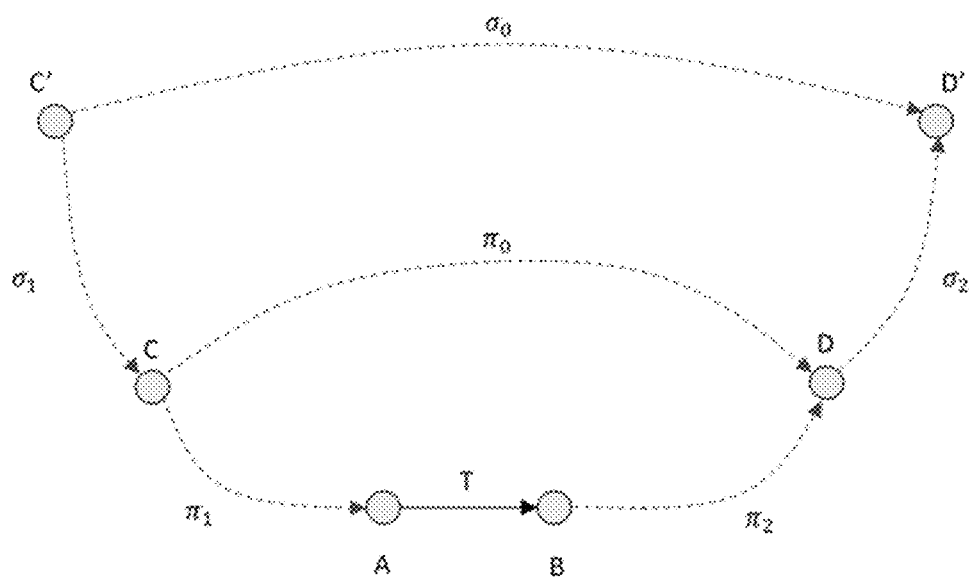
FIG. 9B is a conceptual diagram illustrating another example of a well-formed data structure with an added transform.

As shown in FIG. 9B, mapping module 236 can detect and avoid redundant checks. As shown in FIG. 9B, checking path equivalence for the pair (C D') is redundant. The check for the pair (C D') is subsumed by the check for the pair (C, D) if the paths $\pi_0$ and $\pi_1 T \pi_2$ are equivalent up to an equivalence relation, then the paths $\sigma_0$ and $\sigma_1 \pi_1 T \pi_2 \sigma_2$ are also equivalent up to an equivalence relation (because $\sigma_0$ and $\sigma_1 \pi_0 \sigma_2$ are equivalent up to an equivalence relation in G). This notion of subsumption defines a partial order on the set of relevant pairs. To verify that graph G∪{T} is well-formed, it is enough to check path equivalence for the minimal relevant pairs (i.e., those that are not subsumed).

As discussed above, path equivalence may be checked in an incremental manner, as transforms are added one by one to a base FTG G that is known to be well-formed. Implementing this method requires the ability to efficiently determine whether two arbitrary fields A and B are connected in G and, if so, to efficiently construct a path π from A to B. If mapping module 236 can quickly check whether two fields are connected, mapping module 236 can also efficiently check for subsumption between relevant pairs. Checking connectivity and retrieving paths may not require expensive exploration of G.

To satisfy these requirements, mapping module 236 may store topological information in the FTG itself to avoid re-exploring the same graph multiple times. Because G is well-formed, mapping module 236 may not need to retrieve all the paths from A to B, but only one path. For efficiency, mapping module 236 can store the (or a) shortest path from A to B for all the pairs of fields (A, B) that are connected.

Data structures and a summarization technique that can be used to store topology information about G are discussed in the following. The disclosed data structures may support efficient retrieval and can be updated incrementally as new edges and vertices are added to G. The tradeoffs between these different data structures may include memory footprint, implementation complexity, and computational costs.

A first approach is to explicitly store one path 7 for every pair of nodes (A, B) that are connected. An appropriate data structure is then a map from pairs of node IDs to paths, which themselves can be represented as lists of transforms. For efficient retrieval, the implementation will rely on a hash-map.

A second approach is to store a single edge for every pair of connected fields and augment this with a procedure to construct the paths. This has similarities with routing tables used in computer networks. This data structure may be used in the Yices SMT solver for linear arithmetic problems in the so-called difference logic fragment. Incremental algorithms may use this data structure to incrementally maintain the shortest paths between any two connected nodes in a directed graph.

For example, two fields A and B may be connected where π is the shortest path from A to B. The path may be a sequence of transforms $\pi=(T_1, \ldots, T_n)$, where the source and destination of successive transforms are the same: $T_i$ maps field $F_{i-1}$ to field $F_i$, where $F_0=A$ and $F_n=B$. Mapping module 236 can then decide on a rule for selecting one of the transforms $T_i$ from the path and store that (A, B) is mapped to $T_i$ in a hash-map M. Mapping module 236 can do the same thing for all other pairs of connected nodes in the graph (including the pair (A, $F_{i-1}$) and the pair ($F_{i-1}$, B)). With this data, Mapping module 236 can reconstruct any path between connected nodes using the following recursive procedure:

```
Global hash map: M:Field ID × FieldID→TransformID
function path(x: FieldID, y: FieldID): List[TransformID]:
    if x = y return [ ].    // empty list
    let t = M(x, y):
        if t = null return null    // no path from x to y
        else
            // t is a transform in the FTG
            let x' = source(t) and y' = destination(t) in
                return concat(path(x, x'), [t], path(y', y))
        endif
```

The map M can be extended to store not only a transform ID but also the length of the shortest path π. With this extra information, it is possible to efficiently update M as new transforms are added to the graph.

The rule for picking the transform $T_i$ from path π must be designed to ensure that the recursive procedure terminates.

For example, one can define an a-priori ordering among transform IDs and pick the transform with the smallest ID. Other choices are possible.

Compared with the previous data structure, this approach requires less memory since only a fixed amount of information is stored for every pair of connected fields. Answering path queries may be slightly less efficient because of the recursive procedure, but this cost is small (the same as the path length).

Techniques for reducing the amount of data required by constructing graph summaries (also known as condensations) are described in the following. Condensations amount to computing the strongly connected components (SCC) of the FTG and treating each SCC by a single vertex. A SCC is a set of fields that are all pairwise reachable: given any two fields X and Y in the SCC, there is a directed path from X to Y and a directed path from Y to X. In the FTG context, this means that we can convert from X to Y and conversely: all fields in the SCC carry the same information. In the graph condensation, an edge from SCC $S_1$ to $S_2$ represents all the transforms from fields of $S_1$ to fields of $S_2$.

Well-known algorithms exist for computing SCCs and performing this reduction. Their cost is linear in the size of the graph. It is also straightforward to incrementally update a graph condensation when a new edge is added to the FTG.

To perform incremental path equivalence checks, mapping module 236 may need to construct a path from A to B when A and B are connected. This can be done by selecting a representative vertex V(S) in every SCC S, and storing path information using the data structures presented previously. The paths to represent include paths from nodes of S to the representative V(S), paths in the reverse direction from V(S) to every node of S, and paths between SSCs.

Constructing and maintaining an FTG condensation can provide significant reduction in the memory requirement provided non-trivial SCCs exist in the FTG. This should be the case since the FTG is concerned with translation between different data formats and mapping back and forth between distinct formats should be common. SCCs may also be useful for optimizing the incremental path equivalence checking algorithms described above, as all fields in the same SCC can be treated as equivalent up to an equivalence relation.

Figure 10:
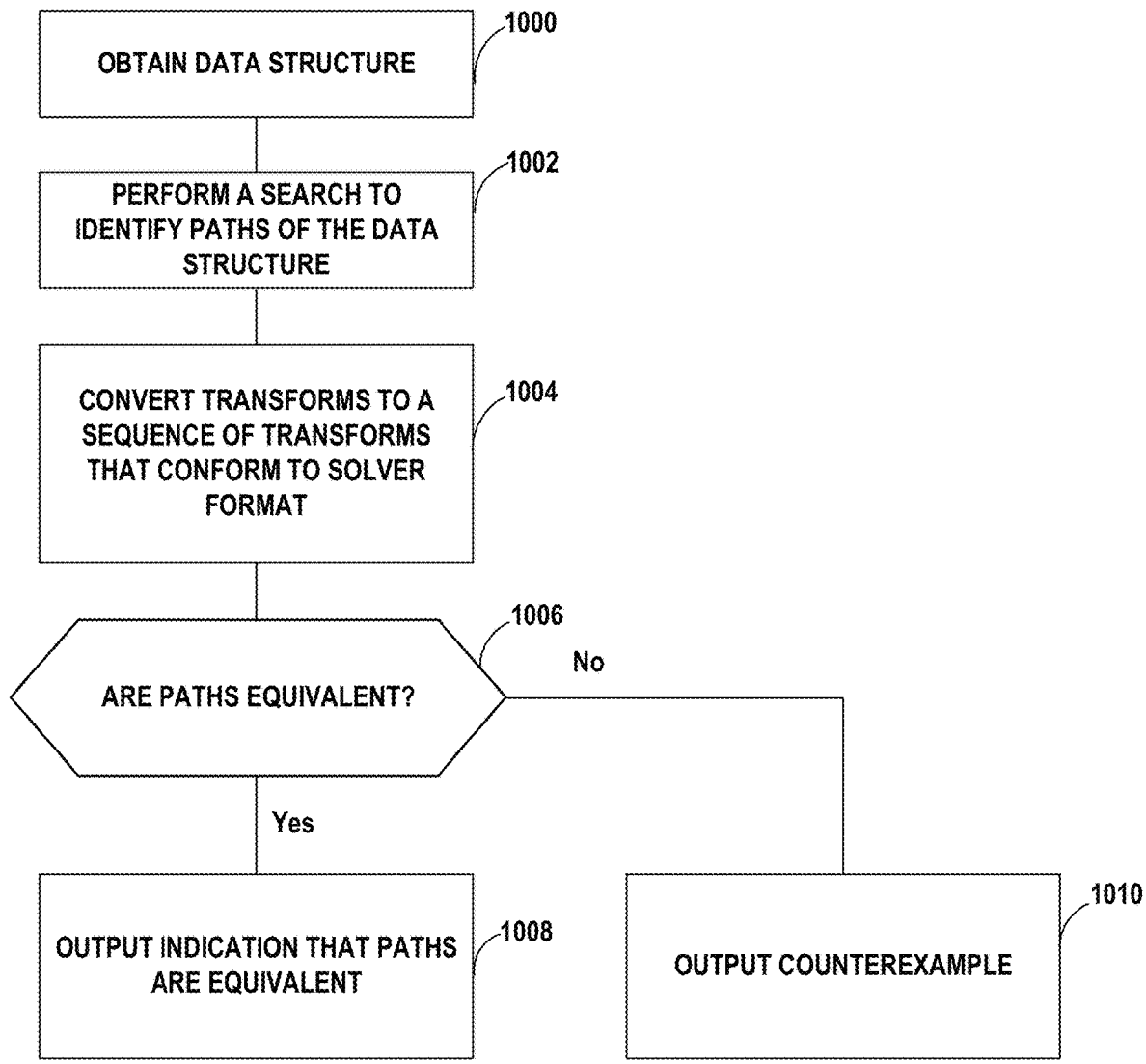
FIG. 10 is a flow chart illustrating an example operation of the system in accordance with the techniques of the disclosure.

FIG. 10 is a flow diagram illustrating an example operation of system 200 in accordance with the techniques of the disclosure. FIG. 10 is described with respect to FIG. 2 for example purposes only. In the example of FIG. 10, system 200 obtains data structure 210 comprising fields (e.g., fields 112) and transforms (e.g., transforms 114) (1000). Data structure 210 may be based on the node topology of a system of systems. Based on the transforms, data structure 210 may define a plurality of conversions of data from output fields to input fields.

Mapping module 236 may perform a search to identify a plurality of paths from a source field to a destination field (1002). In some examples, mapping module 236 may search an index to identify the plurality of paths from the particular source field to the destination field. Translation module 238 may convert, for each path of the plurality of paths, transforms represented by corresponding edges of each path to a sequence of transforms that conform to a solver format (1004). In some examples, converting the transforms represented by corresponding edges of each path to the sequence of transforms may include expressing the sequence of transforms as a composition of transforms in a programming language format, such as a domain-specific language (DSL) format. Converting transforms represented by corresponding edges of each path to the sequence of transforms may further include translating the composition of transforms from the programming language format to the solver format by expanding a definition of each transform in the composition of transforms.

SMT solver 234 may process the sequence of transforms for each path to determine whether all paths of the plurality of paths are equivalent up to an equivalence relation (1006). SMT solver 234 may evaluate an assertion that the sequence of transforms for each path is equivalent up to an equivalence relation, for example as described with respect to FIG. 6. Responsive to the SMT solver 234 determining that the paths of the plurality of paths are equivalent up to an equivalence relation (Yes branch of 1006), SMT solver 234 may output an indication that all the field properties are satisfied, meaning that the paths are equivalent up to an equivalence relation (1008). Responsive to SMT solver 234 determining that any of the paths of the plurality of paths are not equivalent up to an equivalence relation (No branch of 1006), SMT solver 234 may output a counterexample that exemplifies the violated field properties (1010).

The techniques described in this disclosure may be implemented, at least in part, in hardware, software, firmware or any combination thereof. For example, various aspects of the described techniques may be implemented within processing circuitry, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A method of path verification for a system of systems, the method comprising:
    obtaining a data structure that defines a plurality of conversions of data between pairs of fields;
    performing a search to identify a plurality of paths from a source node of the data structure to a destination node of the data structure, wherein the source node corresponds to a first field of the fields and the destination node corresponds to a second field of the fields;
    converting, for each path of the plurality of paths, transforms represented by corresponding edges of the path to a sequence of transforms;
    expressing the sequence of transforms as a composition of transforms in a programming language format;
    converting the composition of transforms from the programming language format to a solver format by expanding a definition of each transform in the composition of transforms:
    processing, by a satisfiability solver, the sequence of transforms for each path to determine whether all paths of the plurality of paths are equivalent up to an equivalence relation, wherein the equivalence relation is a binary relation that is reflexive, symmetric, and transitive;
    outputting an indication of whether all paths of the plurality of paths are equivalent up to the equivalence relation; and
    storing, responsive to the indication identifying that all of the paths of the plurality of paths are equivalent, a single path representative of the plurality of paths from the source node to the destination node for future processing of the plurality of paths in the event an additional path is added between the source node and the destination node.

2. The method of claim 1, wherein each field of the fields comprises a set of subfields, and wherein the data structure further comprises a set of properties that constrain at least one subfield of the set of subfields.

3. The method of claim 1, wherein the programming language format is a domain-specific language format.

4. The method of claim 1, further comprising:
    identifying all paths from any node of the data structure to any other node of the data structure;
    storing all the identified paths; and
    indexing, by at least one of source node and destination node, all the identified paths.

5. The method of claim 4, wherein performing the search comprises searching the index to identify, from the identified paths, the plurality of paths from the source node to the destination node.

6. The method of claim 1, wherein processing the sequence of transforms for each path comprises:
    converting each transform of the sequence of transforms for each path into a Boolean term relating to an input and an output of the transform;
    evaluating, using the satisfiability solver, an assertion that the sequences of transforms for the paths are equivalent up to the equivalence relation,
    wherein the indication of whether all paths of the plurality of paths are equivalent up to the equivalence relation is based on the evaluation.

7. The method of claim 6, further comprising:
    outputting, responsive to determining all paths of the plurality of paths are not equivalent up to the equivalence relation, an indication of a first path of the plurality of paths and an indication of a second path of the plurality of paths, wherein the first path is not equivalent up to the equivalence relation to the second path.

8. The method of claim 1, wherein each field of the fields comprises a canonicalizing transform that defines the equivalence relation such that a first path is equivalent to a second path if a canonical form of the first path is the same as a canonical form of the second path.

9. The method of claim 1, wherein the data structure comprises a field and transform graph.

10. The method of claim 1, wherein the data structure comprises a graph of nodes and edges, wherein each node of the nodes represents a field of the fields, and wherein each edge of the edges connects a different pair of the nodes and defines a transform from a field represented by a first node of the pair of the nodes to a field represented by a second node of the pair of the nodes.

11. A method of path verification for a system of systems, the method comprising:
obtaining an updated data structure for a data structure, wherein the data structure defines a first plurality of conversions between pairs of fields, wherein the updated data structure defines a second plurality of conversions between pairs of fields, and wherein the first plurality of conversions between pairs of fields and the second plurality of conversions between pairs of fields are not equivalent;
performing a search to identify a first path and a second path from a source node of the updated data structure to a destination node of the updated data structure, wherein the source node corresponds to a first field of the fields in the updated data structure, wherein the destination node corresponds to a second field of the fields in the updated data structure, wherein the first path comprises fields in the data structure, and wherein the second path comprises at least one field from the updated data structure that is not in the data structure;
converting, for the first path and the second path, transforms represented by corresponding edges of the first path and the second path to a sequence of transforms that conform to a solver format;
processing, by a satisfiability solver, the sequence of transforms for the first path and the second path to determine whether the first path and the second path are equivalent up to an equivalence relation, wherein the equivalence relation is a binary relation that is reflexive, symmetric, and transitive; and
outputting an indication of whether the first path and the second path are equivalent up to the equivalence relation.

12. The method of claim 11, wherein a length of the sequence of transforms for the first path is less than or equal to a length of a sequence of transforms for every other path in the data structure from the source node to the destination node.

13. A system comprising:
processing circuitry configured to:
obtain a data structure that defines a plurality of conversions of data between pairs of fields;
perform a search to identify a plurality of paths from a source node of the data structure to a destination node of the data structure, wherein the source node corresponds to a first field of the fields and the destination node corresponds to a second field of the fields;
convert, for each path of the plurality of paths, transforms represented by corresponding edges of the path to a sequence of transforms;
express the sequence of transforms as a composition of transforms in a programming language format;
convert the composition of transforms from the programming language format to a solver format by expanding a definition of each transform in the composition of transforms;
process, by a satisfiability solver, the sequence of transforms for each path to determine whether all paths of the plurality of paths are equivalent up to an equivalence relation, wherein the equivalence relation is a binary relation that is reflexive, symmetric, and transitive;
output an indication of whether all paths of the plurality of paths are equivalent up to the equivalence relation; and
store, responsive to the indication identifying that all of the paths of the plurality of paths are equivalent, a single path representative of the plurality of paths from the source node to the destination node for future processing of the plurality of paths in the event an additional path is added between the source node and the destination node.

14. The system of claim 13, wherein each field of the fields comprises a set of subfields, and wherein the data structure further comprises a set of properties that constrain at least one subfield of the set of subfields.

15. The system of claim 13, wherein the programming language format is a domain-specific language format.

16. The system of claim 13, wherein to process the sequence of transforms for each path the processing circuitry is configured to:
convert each transform of the sequence of transforms for each path into a Boolean term relating to an input and an output of the transform;
evaluate, using the satisfiability solver, an assertion that the sequences of transforms for the paths are equivalent up to the equivalence relation,
wherein the indication of whether all paths of the plurality of paths are equivalent up to the equivalence relation is based on the evaluation.

17. The system of claim 13, wherein the data structure comprises a field and transform graph.

18. The system of claim 13, wherein the data structure comprises a graph of nodes and edges, wherein each node of the nodes represents a field of the fields, and wherein each edge of the edges connects a different pair of the nodes and defines a transform from a field represented by a first node of the pair of the nodes to a field represented by a second node of the pair of the nodes.

* * * * *